(12) United States Patent
Kahle et al.

(10) Patent No.: US 6,932,513 B2
(45) Date of Patent: Aug. 23, 2005

(54) COUPLING DEVICE FOR GLASS FIBER CONNECTORS

(75) Inventors: Eberhard Kahle, Berlin (DE); Adrian Benedetto, Berlin (DE); Jörg Adomeit, Berlin (DE); Joachim Brunzel, Berlin (DE)

(73) Assignee: Krone GmbH, Berlin-Zehlendorf (DE)

( * ) Notice: Subject to any disclaimer, the term of this patent is extended or adjusted under 35 U.S.C. 154(b) by 22 days.

(21) Appl. No.: 10/381,614

(22) PCT Filed: Sep. 21, 2001

(86) PCT No.: PCT/EP01/10934

§ 371 (c)(1),
(2), (4) Date: Mar. 26, 2003

(87) PCT Pub. No.: WO02/27373

PCT Pub. Date: Apr. 4, 2002

(65) Prior Publication Data

US 2004/0136656 A1 Jul. 15, 2004

(30) Foreign Application Priority Data

Sep. 26, 2000 (DE) .......................................... 100 47 898
Aug. 11, 2001 (DE) .......................................... 101 39 670

(51) Int. Cl.[7] ............................................... G02B 6/38
(52) U.S. Cl. ....................................................... 385/55
(58) Field of Search .......................... 385/53–56, 71–72

(56) References Cited

U.S. PATENT DOCUMENTS

| 4,418,983 A | 12/1983 | Bowen et al. |
| 5,673,346 A | 9/1997 | Iwano et al. |
| 2002/0012503 A1 | 1/2002 | Kuhne |

FOREIGN PATENT DOCUMENTS

| DE | G 920301.9 | 6/1992 |
| DE | 198 53 982 A1 | 6/1999 |
| DE | 199 05 240 A1 | 8/2000 |
| EP | 0 560 230 A1 | 9/1993 |
| EP | 0 730 177 A2 | 9/1996 |
| JP | 58-129409 | 8/1983 |
| JP | 7-318758 | 12/1995 |
| JP | 8-122570 | 5/1996 |

*Primary Examiner*—Khiem Nguyen
(74) *Attorney, Agent, or Firm*—Merchant & Gould P.C.

(57) ABSTRACT

A coupling device for glass fiber connectors has a front panel (2, 4) and at least one coupling (1, 1', 1", 201, 207), which can be inserted into the front panel from the front face (20, 40, 202) and can be locked by means of latching springs (14, 14', 14", 214). The latching springs engage behind the front panel (2, 4). The coupling (1, 1', 1", 201, 207) can be released from the front panel. In addition to plug openings (21, 41) for the couplings, the front panel (2, 4) may also have openings (22, 23, 23', 42, 47, 45, 46) for releasing the couplings from the front.

11 Claims, 9 Drawing Sheets

FIG.9b
Section B-B

COUPLING DEVICE FOR GLASS FIBER CONNECTORS

FIELD OF THE INVENTION

The invention relates to a coupling device for glass fiber connectors having a front panel, and to couplings which can be inserted into the front panel from the front face.

BACKGROUND OF THE INVENTION

Plug connectors and glass fiber connectors are known, inter alia, from EP 0 590 586 A1 or from U.S. Pat. No. 5,317,663. This coupling for glass fiber connectors can be inserted into a front panel from the front face, and also discloses a coupling which can be locked by means of latching springs which engage behind the front panel. The coupling for glass fiber connectors comprises a housing with two ends, which are in the form of front and rear plug holders, for holding plugs, as well as flanges which project from the housing, suitable for making contact with the front panel and for locking the couple there with at least one latching spring which is arranged on the coupling in order to engage behind the front panel. A latching spring such as this has two spring tabs on opposite sides of the rear plug holder. The latching springs are in the form of leaf springs which engage though a corresponding aperture in the front panel and thus lock the coupling in the front panel. For this purpose, the leaf spring or spring tongue can be pressed to such an extent against the coupling housing that the leaf spring or the spring tab passes through the front panel in the pushed-in state, and then spreads. The use of a coupling or coupling device such as this is dependant on the front panel having appropriate apertures, and the front panel must be provided by means of an appropriate configuration with a specific aperture in order to lock couplings there; the coupling must be released from the rear face of the front panel.

In addition, plug connectors having latching devices which can be released from the front face of a housing or of a front panel and which project from the front panel are known from telephone technology and from local area networks (EP 0 766 350 A2) In this case, inadvertent release is possible, and a relatively large amount of space is required to manually grip the latching device.

SUMMARY OF THE INVENTION

The invention is thus based on the problem of making it possible to simplify the production of such coupling devices and/or allowing couplings for glass fiber connectors to be mounted at the front.

According to the invention, a coupling device for glass fiber connectors has a front panel and couplings, which can be inserted into the front panel and can be released from the front face, and couplings which can be locked by means of latching, springs in the front panel with the front panel also having openings for releasing the couplings on its front face, in addition to plug openings for the couplings.

A front panel for a series of couplings which are to be arranged alongside one another has, for example, an opening which corresponds to the accumulated coupling widths.

Each of the inserted couplings has a flange for making contact in front of the front panel and, in a first embodiment, has a latching spring on the coupling surface, in order to engage behind the front panel. In addition to the plug opening, each coupling space has a further associated opening, into which a tool can be inserted through the front panel, by means of which latching spring is compressed, thus unlocking the coupling and allowing it to be released from the front panel.

In a second variant, an integral latching spring has two spring tabs on opposite sides of a coupling.

The front panel which is used for this purpose likewise has an elongated opening for the insertion and locking of a large number of couplings which are arranged in a row, with each spring tab having an associated spring groove as an extension of the plug opening, although at least one of the locked couplings—generally at one end of the plug opening—has, instead a latching spring, a screw connection which can be released from the front face, to the front panel. When the couplings are installed, the spring grooves are located alongside the spring tabs, which are in turn seated behind a latching tab. This makes it possible, once a coupling has been released, for other couplings to be withdrawn and released individually, or all of them successively, after pushing them to the side with their latching tabs through the spring grooves.

In a further embodiment, a part of the latching spring projects though the flange to the front face and can then be compressed in a similar way to a latching clip according to the prior art, and the coupling can then be withdrawn with the spring tab unlocked.

A further solution for couplings of this generic type is distinguished by the latching spring being composed of two side pieces which are adjacent to two side surfaces of the coupling, and by these side pieces having catches which can hook behind or in the front panel. These two side pieces of the latching spring are connected by means of a pressure plate, which clasps the third side surface of the coupling. The pressure plate is supported by means of a spring leg on the coupling, in which case this spring leg may be an integrally projecting element of the pressure plate itself or may be an additionally fitted element under the pressure plate where it provides sprung support relative to one housing face of the coupling.

The side pieces themselves may advantageously be provided with a notch or a clasp, which is supported behind a step on the flange and can be positioned there, so that, when pressure is exerted on the pressure plate, although the distance between the side pieces and the flange can be changed, the side pieces are still adjacent to the side surfaces, but their positions slightly shifted with respect to the third side surface, to which the pressure plate and the spring leg are fitted. If the side pieces are located within the contour of the coupling, only an aperture without any further steps need be incorporated in the front panel, thus allowing the coupling housing to pass. A simple rectangular or square stamped area in the front panel is thus sufficient to install the plug together with the coupling and its latching spring and to lock them in the front panel. During the locking process, the pressure plate is compressed against the force of the spring leg, and the coupling part, or to be more precise the coupling housing, is then pushed together with the latching spring into the recess in the front panel, and the load is then removed from the pressure plate so the corresponding latching tabs on the side pieces can engage behind the front panel. This results in an interlocking connection and the coupling can also be removed again individually.

In one exemplary embodiment, the catch on the side piece forms the end of the notch which is then, of course, at least as long as the flange and the front panel arm thick.

According to one development, the step on the flange also occupies virtually the entire side area of the coupling between the flange or, in the case of a double-sided arrangement and flanges, between both flanges and the front and rear plug holder openings. In other words, the entire side surface of the coupling housing snaps back between the plug holder openings, thus offering sufficient space for the adjacent side pieces of the spring.

For the sake of simplicity, for example, in the case of a coupling housing of rectangular cross section, a flange which in each case has a latching spring is arrange on each of the two narrow faces of the coupling, which latching springs can be pressed together in opposite directions and, after passing through the front panel, are automatically relieved of the load owing to the effect of the spring legs under the pressure plate, once a force is no longer applied to the pressure plate. As is known per se, the latching spring may be composed of metal, plastic or coated metal, as those skilled in the art will be aware from the prior art.

A latching spring formed in this way may also be used in the same simple manner for duplex plugs.

The various features of novelty which characterize the invention are pointed out with particularity in the claims annexed to and forming a part of this disclosure. For a better understanding of the invention, its opening advantages and specific objects attained by its uses, reference is made to the accompanying drawings and descriptive matter in which preferred embodiments of the invention are illustrated.

BRIEF DESCRIPTION OF THE DRAWINGS

FIG. 6 is a second embodiment of a front panel for a coupling as shown in FIG. 5a;

FIG. 9b is a section B—B through FIG. 9a;

DESCRIPTION OF THE PREFERRED EMBODIMENTS

Referring to the drawings in particular, identical reference symbols are used for identical or equivalent parts in the following text.

Figure 3:
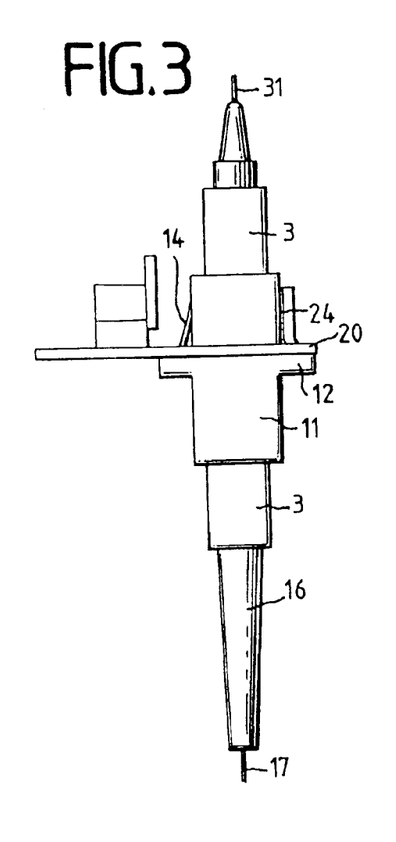
FIG. 3 is a side view of a coupling device with a front panel, with a first embodiment of a sprung lock.

FIG. 3 shows a first form of the lock for the coupling 1. Glass fiber cables 17 have kink protection 16, which is held by a plug 3. The coupling is provided with plug holders 11, 13 at both ends of a housing, to the front and rear of the front panel. A flange 12 of the coupling 1 rests on the front face of the front panel 2, while one side of the coupling is supported on the guide 24 and the other side is locked by means of a latching spring 14 behind the front panel 2. Glass fiber cables 31 are combined in the same way in a plug 3, whose configuration is complementary to that of the coupling halves 11 and 13, and can be inserted into them, so the glass fiber connection is produced behind the front panel 2.

Figure 1:
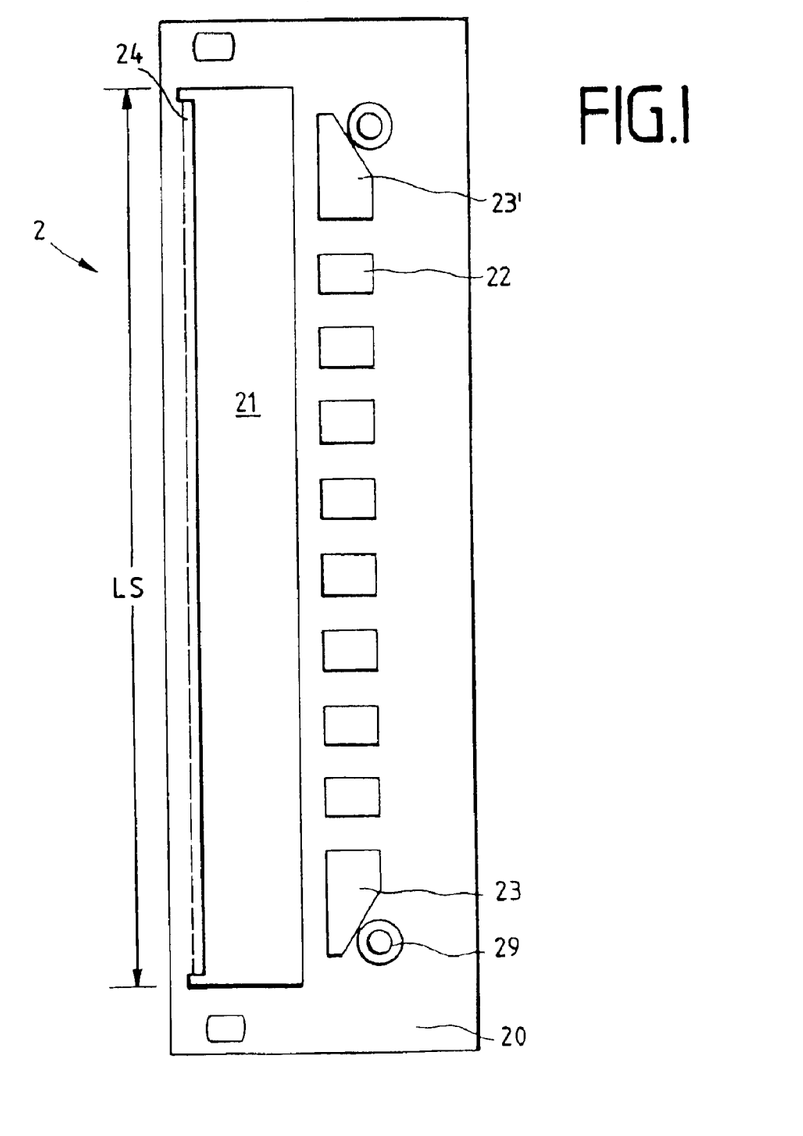
FIG. 1 is a first embodiment of a front panel for couplings.
Figure 2:
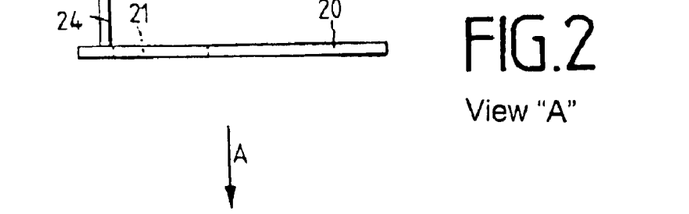
FIG. 2 is a side view of the front panel shown in FIG. 1.
Figure 4:
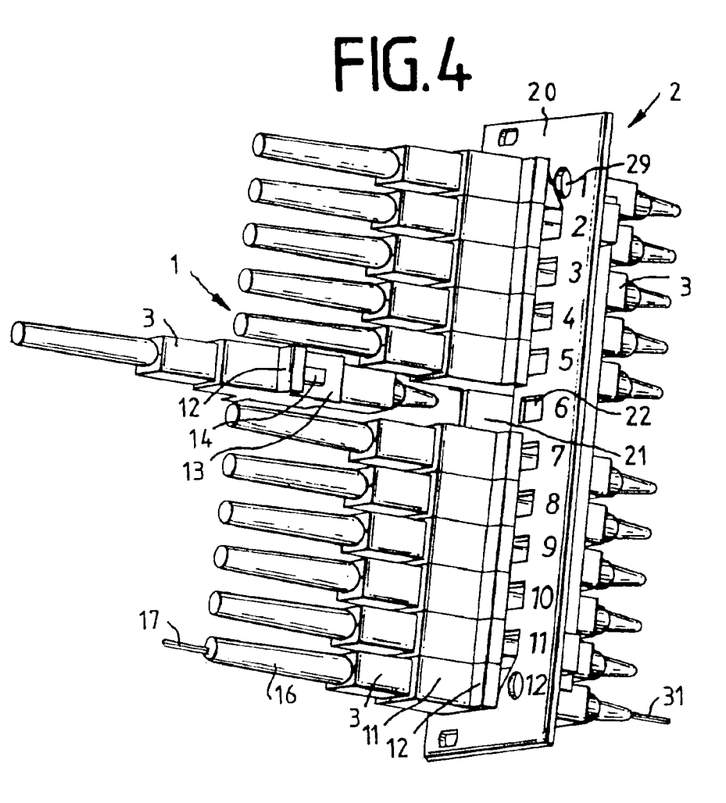
FIG. 4 is a perspective plan view of a first front panel shown in FIG. 1 with a coupling.

FIGS. 1–4 show a first embodiment of a front panel 2, whose form can be seen from the view A shown in FIG. 2, for a plug housing that is not illustrated. The front 20, which can be fixed on a housing by means of screws through openings 29, has an elongated opening 21 with a width LS for a large number of couplings. However, couplings may also have individual plug-in spaces with correspondingly smaller openings. The side view A shown in FIG. 2 shows the guide 24. A tool, for example a screwdriver, can be inserted through openings 22, 23, 23', and can then be used to compress the spring tab. The coupling can then be withdrawn. FIG. 4 shows the removal situation in which a coupling has been released and has been withdrawn through the plug opening 21 to the front face; in this position, the coupling and/or the plugs on the glass fiber cables 17, 31 can be uncoupled.

Figure 5A:
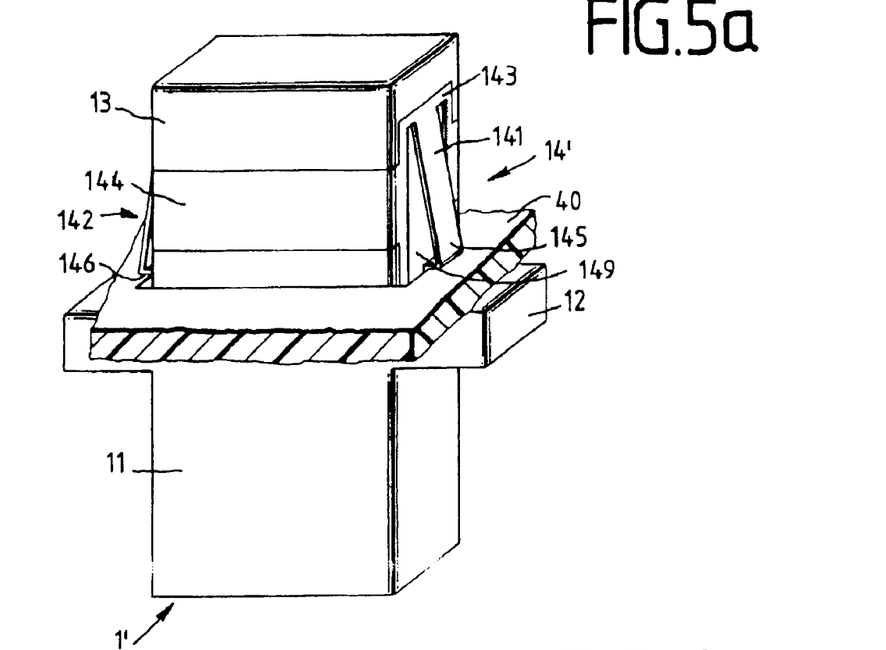
FIG. 5a is a second embodiment of a sprung lock for the coupling the front panel.
Figure 5B:
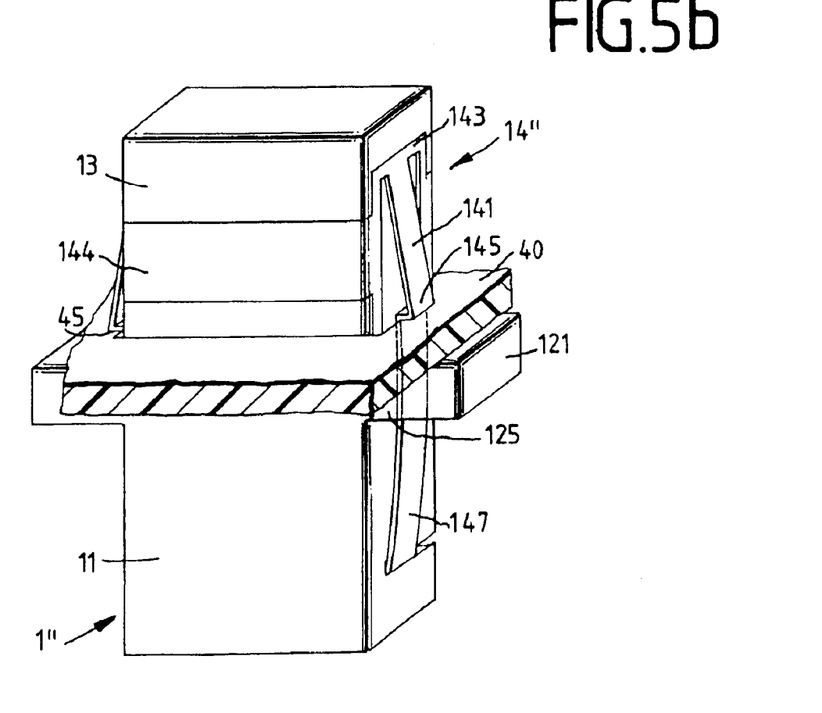
FIG. 5b is a third embodiment of a sprung lock for the coupling in the front panel.

FIGS. 5a and 5b show, in a highly enlarged manner, schematic details of the locking of the couplings 1', 1" to the housing and its font plug holder 11, the flange 12 and rear plug holder 13 through a latching spring 14' or 14" in the front panel 40, which is composed of plastic. The springs 145, 146, analogously to FIG. 5a, are known per se from the prior art, although springs with a chamfered tab are preferably used for the invention.

The latching springs 14' in FIG. 5a differ only by having the spring clip 147 as shown in FIG. 5b, which is passed through a flange groove 125 in the flange 121 or groove 45 in the front 40, thus allowing the spring tab 145 to be unlocked from the front 40 from the front face, when the spring clip is pressed in the direction of the plug holder 11.

In principle, the latching spring 14', 14" is composed integrally of a metal plate with a spring frame 143 in which the spring tongue 141 or 142 is located. The two spring tongues 141, 142 on the sides of the coupling 1' can be fitted as a unit to the plug holder 13 through the spring connector 144, and are fixed there in a depression on the surface, the spring bearing 149, for example by adhesive bonding or clamping.

Figure 6:
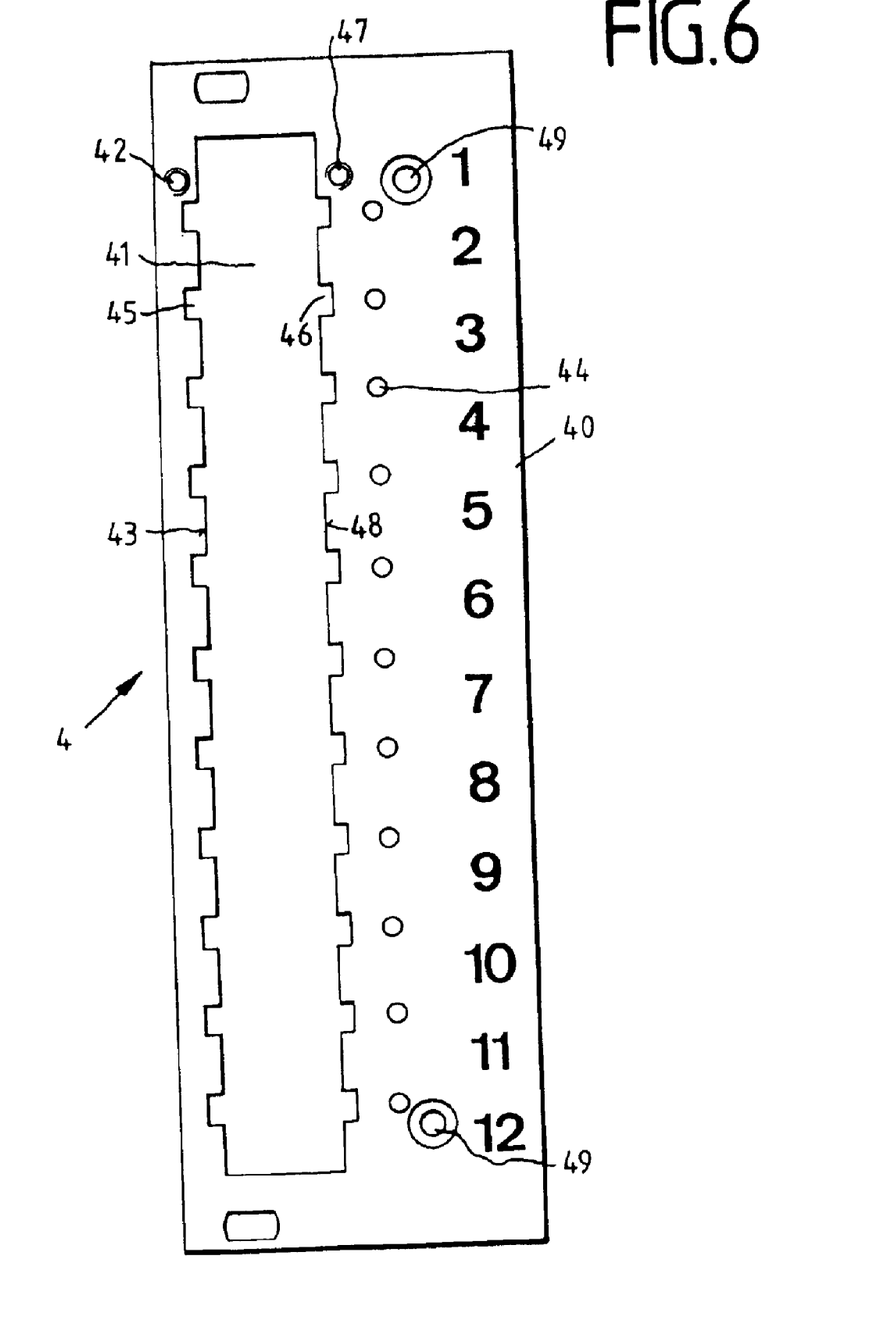
Figure 7:
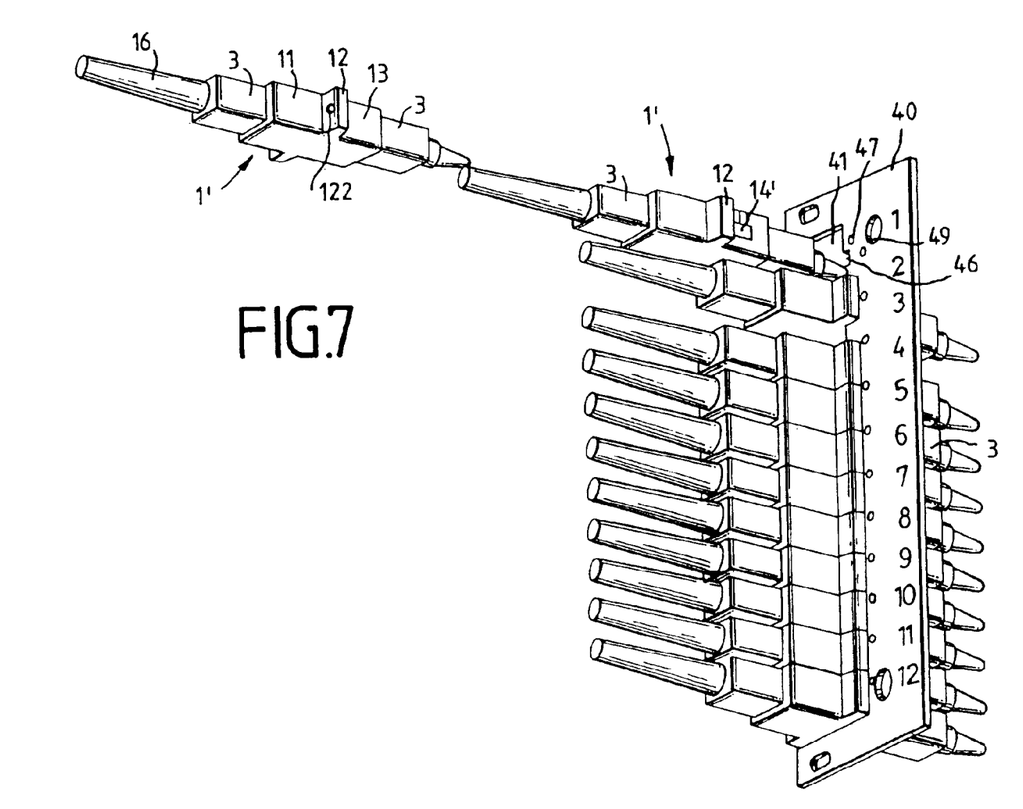
FIG. 7 is a perspective plan view of a front panel as shown in FIG. 6 with couplings in the installation situation.
Figure 8:
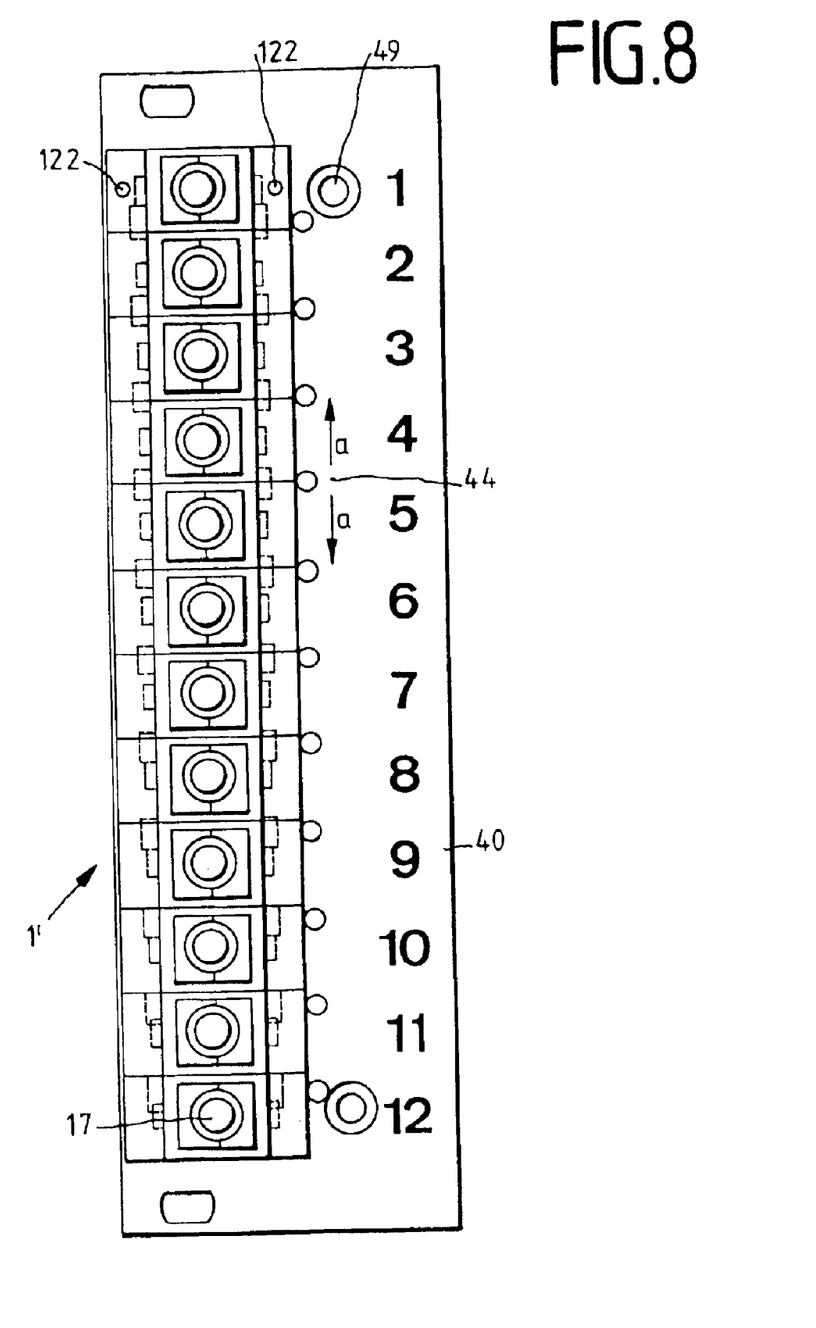
FIG. 8 is a plan view of a completely installed arrangement as shown in FIG. 7.

Latching springs such as these are used in a further embodiment of the invention as shown in FIGS. 6–8. The front 40 is screwed through openings 49 to a housing that is not illustrated. A front panel 4 with a front 40 has a plug opening 41 for 12 couplings (FIGS. 7, 8) with 11 spring grooves 45, 46 for unlocking the couplings with latching springs 14, interrupted by latching tabs 43, 48, behind which the spring tabs 145, 146 are hooked. The position of the spring grooves is indicated by positioning marks 44. The distance between the spring grooves 45, 46 and the associated positioning marks 44 diverges with respect to one another. The distance a shown in FIG. 8 in the exemplary embodiment is greater than the width of the couplings. This means that the couplings cannot all fall out of the plug opening at the same time after releasing a first coupling, but can be removed individually from a spring groove only after deliberately shifting each coupling to the side. The last coupling, or one coupling cannot be inserted by means of spring grooves; this is fixed by means of screws (not shown) in threaded holes 42, 47. The other couplings can be moved behind the spring tabs 43, 48 once they have been inserted in the area of the spring groove. However, if the plug opening size has appropriate tolerances, the couplings can at the same time be pressed against the pressure of the latching spring onto the correct plug space behind the latching tab of the plug opening. In a corresponding way, when releasing a coupling 1' as shown in FIG. 7—where the plug spaces are numbered 1–12 on the front 40—the screws (which are not illustrated) which fix the flange 12 in the flange holes 122 and in the threaded holes 42, 47 are first of all released from the front 40. The first coupling 1' is then withdrawn, and the next coupling is moved as far as a spring groove 45, 46 and is with. All the couplings, or else only individual couplings, can be withdrawn successively or, conversely, can be installed successively again.

All the couplings 1' are equipped in the same way, that is to say the first coupling also has a latching spring 14' as shown in FIG. 5a. However, this integral spring is removed if there is only one coupling, and for the first coupling. FIG. 8 shows a plan view of the complete installed situation.

Figure 9A:
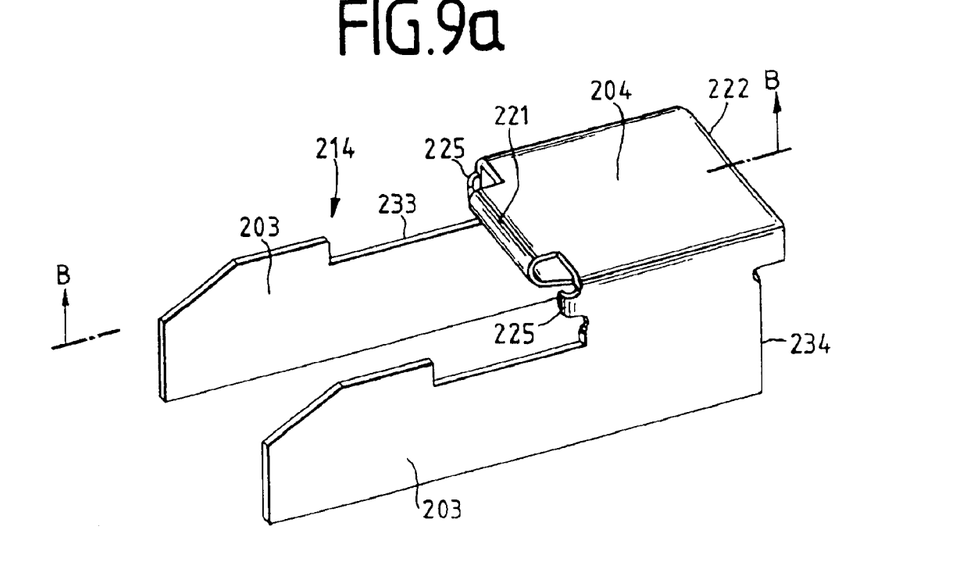
FIG. 9a is a perspective plan view of a latching spring according to the invention.

FIG. 9a shows a perspective plan view of the latching spring 214 according to invention, based on the further solution and as an alternative to the structure shown in FIG. 5b or a coupling, essentially comprising two side pieces 203 and a pressure plate 204 which connects the side pieces 203.

Figure 9B:
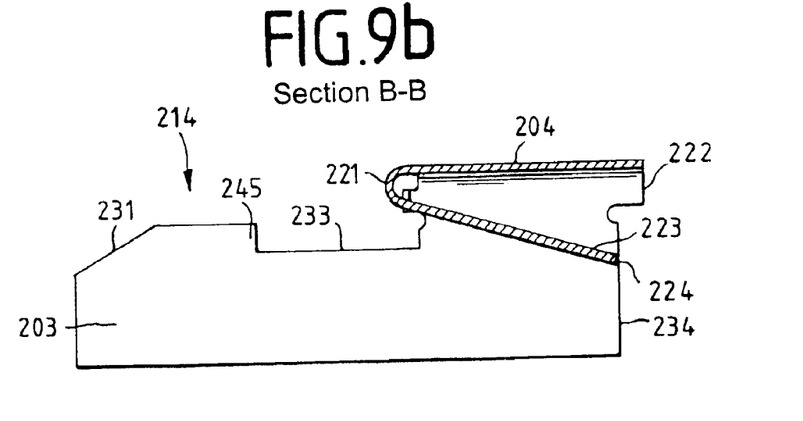

FIG. 9b shows the section B—B through the latching spring as indicated in FIG. 9a, with the pressure plate 204 having as an integral component a spring leg 223 which extends under the pressure plate 204 commencing at the front plate start 221 of the pressure plate 204, and which can be supported by a support 224 on the coupling, which is not illustrated, and/or on the upper face of the coupling housing. It is obvious that this spring leg 223 can bend further in the direction of the pressure plate 204 when it is supported on the support 224 on the housing and corresponding vertical pressure is applied to the pressure plate 204. The side piece 203 has a chamfer 231 in order to make it easier to push the spring 214 through the recess 261 in the front panel 202. The spring tab 245 of the side piece 203 comes to rest behind the front panel 202. The clasp 233 is used for fixing the latching spring 214 behind the flange of the coupling, which is not illustrated, as is evident in particular from FIG. 12. The rear plate end 222 and the bent lugs 225 as well as the side piece end 234 are used for supporting the latching spring and to secure its position on the plug holder 221 (FIGS. 10 to 12).

Figure 10:
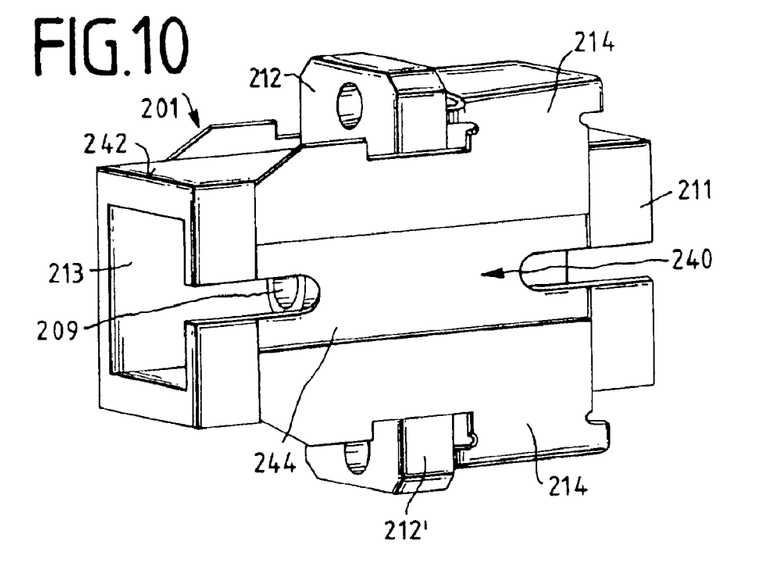
FIG. 10 is a perspective view of a simplex coupling with latching springs as shown in FIGS. 9a, b installed.

FIG. 10 shows a simplex coupling 201 with a flange 212 or 212' on the narrow faces 242, of the coupling 201 which has a rectangular cross section. A rear plug holder 213 and a front plug holder 211 are used for the insertion of plug connectors, in order to make an operative connection with the plug pin centering sleeve 209. The latching spring 214 is seated behind the flanges 212, 212' and is supported by the spring leg, which cannot be seen here, on the narrow face 242 of the coupling housing of the simplex coupling 201, with the side pieces 203 being adjacent in steps 244, which at the same time form side surfaces of the simplex coupling 201, and hence disappearing within the contours of the plug holders 213, 211, which form the largest cross section, so that the side surfaces of the plug holders 213, 211 and the surface of the side piece 203, which are located close together on the side surface 240, form a common surface relative to the front panel 202 (FIG. 12).

Figure 11:
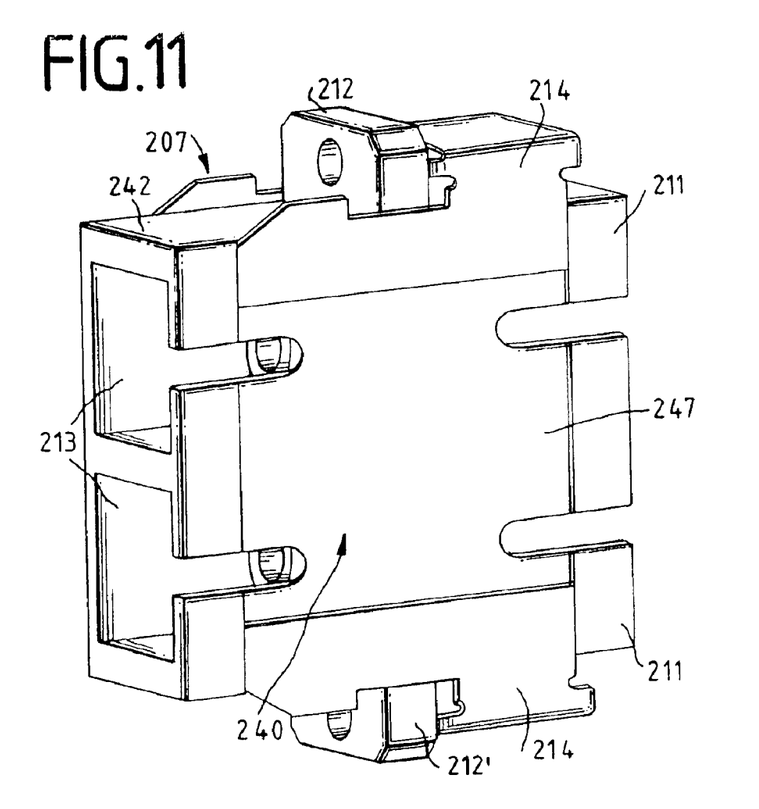
FIG. 11 is a perspective view of a duplex coupling with latching spring as shown in FIGS. 9a, b installed.

In a similar way, FIG. 11 shows the housing of a duplex coupling 207 for in each case two rear plug holders 213 and two front plug holders 211. The side surfaces 240 are likewise formed with steps 247 here, which are located between the plug holders 213, 211 and the flanges 212, 212'.

Figure 12:
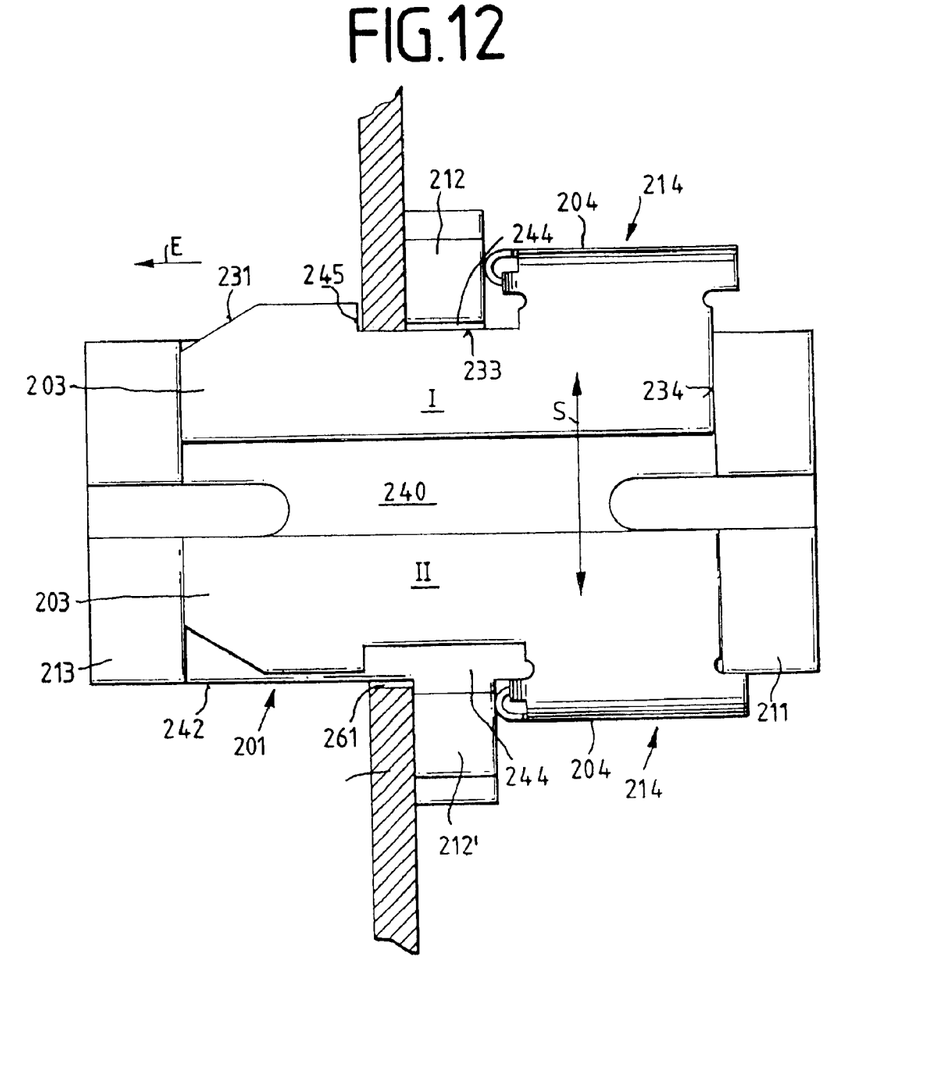
FIG. 12 is a side view, with an illustration of the process for installing a simplex coupling in a front panel.

FIG. 12 shows a section view of a front panel 202 with a recess 261 and a single rectangle aperture. The two latching springs 214 are shown in the installed position, with the position designation I at the top showing an already locked coupling situation, while the position designation II in the lower half shows a situation in which pressure is still being exerted on the pressure plate 204, so that the latching spring with its side piece 203 on the side surface 240 of the simplex coupling 201 is shifted somewhat against the spreading direction S of the two latching springs 214.

In the illustrated position, the completely assembled simplex coupling has been fitted as shown in FIG. 10, by the two pressure plates 204 first of all being compressed against the spreading direction S and the simplex coupling 201 then being pushed in the insertion direction E through the recess 261 in the front panel 202. It is also possible to install the coupling 201, 207 with the latching spring 204 without compressing the pressure plate 204 into the recess 261 in the front panel 202, if the two latching springs 214 are automatically compressed by means of a chamfer 231, which has an appropriately shaped incline, during insertion into the recess in the front panel 202, and thus pass through the recess. The position I shows bow the latching tab 245 engages behind the front panel 202 once the load has been removed from the pressure plate 204, thus producing an interlocked connection for the simplex coupling 201 in the front panel 202. This clearly shows that the side pieces 203 of the latching springs 214 are held securely between the projecting plug holders 213, 211 in the step 244 between the flanges 212, 212'. Thus, for disassembly, pressure can thus be exerted on the pressure plate 204 just by two fingers against the spreading direction S, in order to move the side pieces 203 toward one another, and the simplex coupling 201 can be unlocked again, and can be removed from the front panel 202, and hence from the recess 261 in the front panel.

While specific embodiments of the invention have been shown and described in detail to illustrate the application of the principles of the invention, it will be understood that the invention may be embodied otherwise without departing from such principles.

What is claimed is:

1. A coupling for glass fiber connectors, comprising: a housing having two ends which are in the form of front and rear plug holders, for holding plugs; at least one flange projecting from the housing and being suitable for making contact with a front panel in order to lock the coupling; and at least one latching spring arranged on the coupling to engage behind the front panel, wherein the latching spring extends over at least part of the plug holders and, at the front on the coupling, the latching spring has a locking device for locking in and removing from the front panel wherein the latching spring comprises two side pieces adjacent to two side surfaces of the coupling, with spring tabs which are connected by a pressure plate, the pressure plate extending over a third side surface of the coupling;

wherein the side pieces have a clasp which can be positioned behind a step on the flange.

2. The coupling as claimed in claim 1, wherein the pressure plate is supported by a spring leg on the coupling.

3. The coupling as claimed in claim 1, wherein the step covers major parts of the side surface of the coupling between the flange and the plug holders.

4. The coupling as claimed in claim 1, wherein two latching springs on the housing have spring legs which are supported in opposite directions on mutually opposite sides of the coupling.

5. The coupling as claimed in claim 1, wherein the coupling is a duplex coupling.

6. A coupling for fiber optic connectors for use with a panel having an insert opening comprising:

a housing having a front plug receptacle, and an opposite rear plug receptacle, the housing defining a longitudinal axis from the front plug receptacle to the rear plug receptacle, the housing having a flange for positioning against a front side of the panel;

a latch spring mounted to the housing, the latch spring including two latching tabs for positioning against a rear side of the panel, the latching tabs positioned on opposite sides of the housing, the latch spring further including a pressure plate connecting the two latching tabs, the latch spring including a spring member between the pressure plate and the housing and which engages an outer surface of the housing;

wherein the flange is positioned between the latching tabs and the pressure plate along the longitudinal axis;

wherein the pressure plate is accessible from the front side of the panel when the latching tabs are positioned against the rear side of the panel, and the flange is positioned against the front side of the panel, wherein the coupling can be unlatched and removed from the insert opening of panel by moving the pressure plate against the spring member, thereby moving the latching tabs.

7. The coupling as claimed in the claim 6, wherein the latching tabs each have a portion positioned within a recess of the coupling.

8. The coupling as claimed in claim 6, wherein the flange defines a recess, and the latching tabs each have a clasp, which is positioned within the recess flange.

9. The coupling as claimed in claim 6, wherein two latching springs are arranged on opposite sides of the coupling, with the respective spring members being supported in opposite directions.

10. The coupling as claimed in claim 6, wherein the coupling is formed as a simplex coupling.

11. The coupling as claimed in claim 6, wherein the coupling is formed as a simplex or duplex coupling.

* * * * *

UNITED STATES PATENT AND TRADEMARK OFFICE
CERTIFICATE OF CORRECTION

PATENT NO. : 6,932,513 B2
APPLICATION NO. : 10/381614
DATED : August 23, 2005
INVENTOR(S) : Kahle et al.

It is certified that error appears in the above-identified patent and that said Letters Patent is hereby corrected as shown below:

Col. 1, line 22: "locking the couple there" should read --locking the coupling there--

Col. 2, line 12: "instead a latching spring," should read --instead of a latching spring,--

Col. 2, line 46: "their positions slightly" should read --their position is slightly--

Col. 2, line 65: "front panel arm thick." should read --front panel are thick.--

Col. 3, line 23: "its opening advantages" should read --its operating advantages--

Col. 5, line 13: "is with. All" should read --is withdrawn. All--

Signed and Sealed this

First Day of May, 2007

JON W. DUDAS
*Director of the United States Patent and Trademark Office*